(12) United States Patent
Aldridge

(10) Patent No.: US 7,389,017 B2
(45) Date of Patent: Jun. 17, 2008

(54) DENSE WAVELENGTH DIVISION MULTIPLEXING ON COARSE WAVELENGTH DIVISION MULTIPLEXING NETWORKS

(75) Inventor: James Finn Aldridge, Palo Alto, CA (US)

(73) Assignee: Finisar Corporation, Sunnyvale, CA (US)

( * ) Notice: Subject to any disclaimer, the term of this patent is extended or adjusted under 35 U.S.C. 154(b) by 526 days.

(21) Appl. No.: 10/802,434

(22) Filed: Mar. 17, 2004

(65) Prior Publication Data

US 2004/0247322 A1 Dec. 9, 2004

Related U.S. Application Data

(60) Provisional application No. 60/455,633, filed on Mar. 17, 2003.

(51) Int. Cl.
*G02B 6/28* (2006.01)
(52) U.S. Cl. .................................................. 385/24
(58) Field of Classification Search ................ 385/24; 398/83
See application file for complete search history.

(56) References Cited

U.S. PATENT DOCUMENTS

2002/0105692 A1* 8/2002 Lauder et al. ............... 359/124

FOREIGN PATENT DOCUMENTS

WO WO 99/12268 * 3/1999

OTHER PUBLICATIONS

Aldridge, J., The Best of Both Worlds, [online] Sep. 2002 [retrieved on Oct. 23, 2002]. Retrieved from the Internet: URL: http://1we.pennnet.com/Articles/Article_Display.cfm?Section=Articles&Subsection=Display&ARTICLE_ID=155526.
Bell, Robert, World Teleport Association, Intelligent Cities and Tech-Space: What Lies Ahead, [online] Feb. 2002 [retrieved on Nov. 7, 2002]. Retrieved from the Internet: URL: http://www.facilitycity.com/busfac/bf_02_02_intel.asp.
U.S. Appl. No. 10/910,184, filed Aug. 2, 2004, James Finn Aldridge et al.
U.S. Appl. No. 10/910,424, filed Aug. 2, 2004, Johnny Zhong et al.
U.S. Appl. No. 10/889,333, filed Jul. 12, 2004, Steve Wang.

* cited by examiner

*Primary Examiner*—Quyen Leung
(74) *Attorney, Agent, or Firm*—Workman Nydegger (57) ABSTRACT

Multiple dense wavelength division multiplexing (DWDM) signals are superimposed on a single channel of a multiplexed signal in a coarse wavelength division multiplexing (CWDM) system. The DWDM signals may be superimposed on the CWDM spectrum in a metro area network that has legacy optical components that are otherwise designed for use with CWDM signals. This system increases the data transmission rates that can be achieved over an existing network that has less expensive CWDM optical components. The system also provides a scalable solution for increasing data transmission capacity in new networks.

24 Claims, 6 Drawing Sheets

DENSE WAVELENGTH DIVISION MULTIPLEXING ON COARSE WAVELENGTH DIVISION MULTIPLEXING NETWORKS

CROSS-REFERENCE TO RELATED APPLICATIONS

This application claims the benefit of U.S. Provisional Application No. 60/455,633, filed Mar. 17, 2003, and entitled "Dense Wavelength Division Multiplexing on Coarse Wavelength Division Multiplexing Networks," which is hereby incorporated herein by reference.

BACKGROUND OF THE INVENTION

1. The Field of the Invention

The invention generally relates to cost-effective methods for building and operating metro area networks. More specifically, the invention relates to scaling an existing coarse wavelength division multiplexing infrastructure by using dense wavelength division multiplexing signals.

2. Description of the Related Art

In the field of data transmission, one method of efficiently transporting data is through the use of fiber optics. Digital data is propagated through a fiber optic cable using light emitting diodes or lasers. Light signals allow for extremely high transmission rates and very high bandwidth capabilities. Light signals are also resistant to electromagnetic interference that would otherwise interfere with electrical signals. Light signals are more secure because they do not allow portions of the signal to escape from the fiber optic cable as can occur with electrical signals in wire-based systems. Light also can be conducted over greater distances without the signal loss typically associated with electrical signals on copper wire.

It is often desirable in the networking context to maximize the amount of data that can be propagated through the network. It is also desirable for economic reasons to minimize the hardware used to create the network infrastructure. To accomplish both of these objectives, multiplexing schemes are used to transmit multiple signals along a single data path such as a fiber optic fiber. One particularly useful and successful method of multiplexing is wavelength division multiplexing. In the fiber-optic systems, wavelength division multiplexing includes transmitting various individual signals along a single fiber, with each signal being used to transmit a different light wavelength. To accomplish wavelength division multiplexing, several specialized optical components are needed, including demultiplexers (demuxes), multiplexers (muxes), mux/demux modules, and optical add drop multiplexers (OADMs).

Figures 1, 1A:
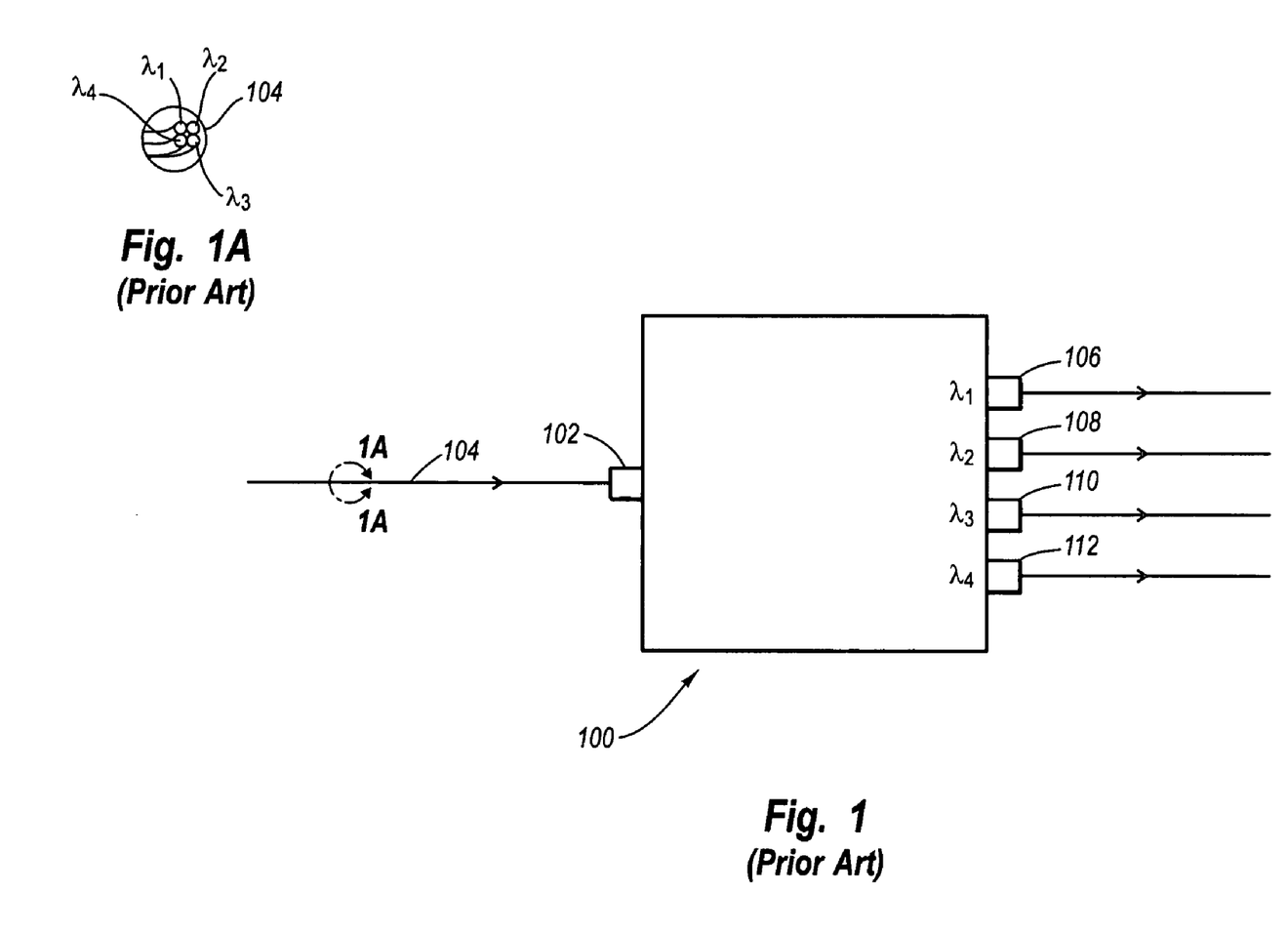
FIG. 1 illustrates an exemplary optical demultiplexer for use in wavelength division multiplexing fiber optic networks.

A demultiplexer generally takes as its input an optical transmission that includes a number of individual signals, with each signal being transmitted using a particular wavelength of light. An exemplary optical demultiplexer is shown in FIG. 1 and designated generally as 100. The optical demultiplexer 100 has an input port 102. The input port 102 receives a multiplexed transmission 104. In the present example, the multiplexed transmission 104 has four individual signals, each of different wavelengths, which are designated in this example as λ1, λ2, λ3, and λ4, as indicated in FIG. 1A. The optical demultiplexer 100 is a passive device, meaning that no external power or control is needed to operate the device. Although, in this example, the optical demultiplexer 100 is a passive device, it should be noted that active devices can be used in optical demultiplexing as well. Using a combination of passive components, such as thin-film three-port devices, mirrors, birefringent crystals, etc., the optical demultiplexer 100 separates the multiplexed signal 104 into its constituent parts. Each of the individual wavelengths, each representing a separate signal on a communication channel, is then output to one of output ports 106, 108, 110, 112.

A multiplexer functions in the inverse manner as the demultiplexer. Multiplexers can often be constructed from demultiplexers simply by using the output ports 106, 108, 110, 112 as input ports and the input port 102 as an output port.

Figure 2:
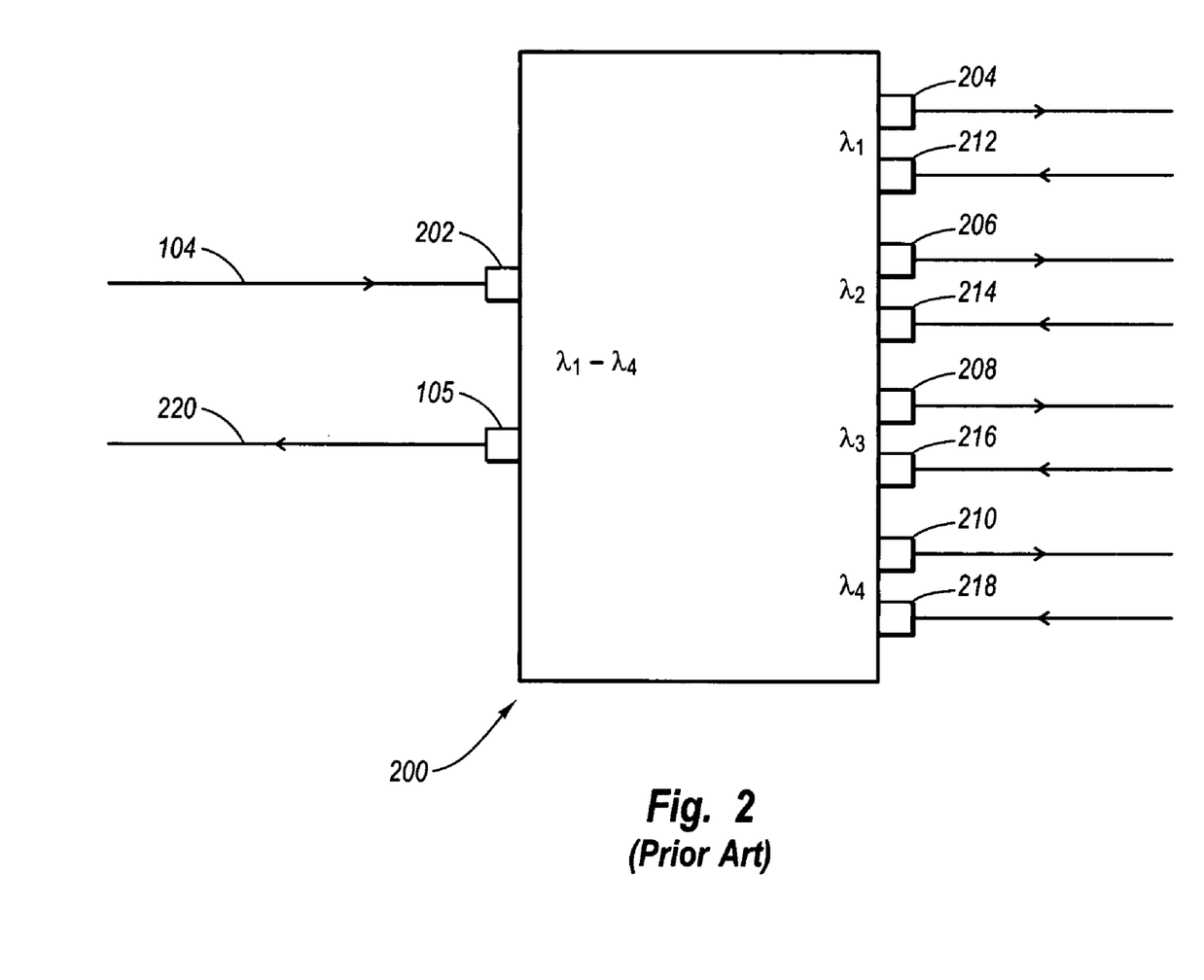
FIG. 2 illustrates a mux/demux for use in wavelength division multiplexing fiber optic networks.

An optical device that combines the functionality of a demultiplexer and a multiplexer is known as a mux/demux. An exemplary mux/demux is shown in FIG. 2 and designated generally as 200. The mux/demux 200 has a multiplexed input port 202 that accepts as its input a multiplexed transmission 104. The multiplexed transmission 104 is separated into its constituent parts and output to demultiplexed output ports 204, 206, 208, 210. In a multiplexing operation, demultiplexed input ports 212, 214, 216, 218 accept as their input individual signals, with each signal being encoded on a different optical wavelength. The individual signals are combined into a multiplexed transmission and output to the multiplexed output 220 from output port 105.

Figure 3:
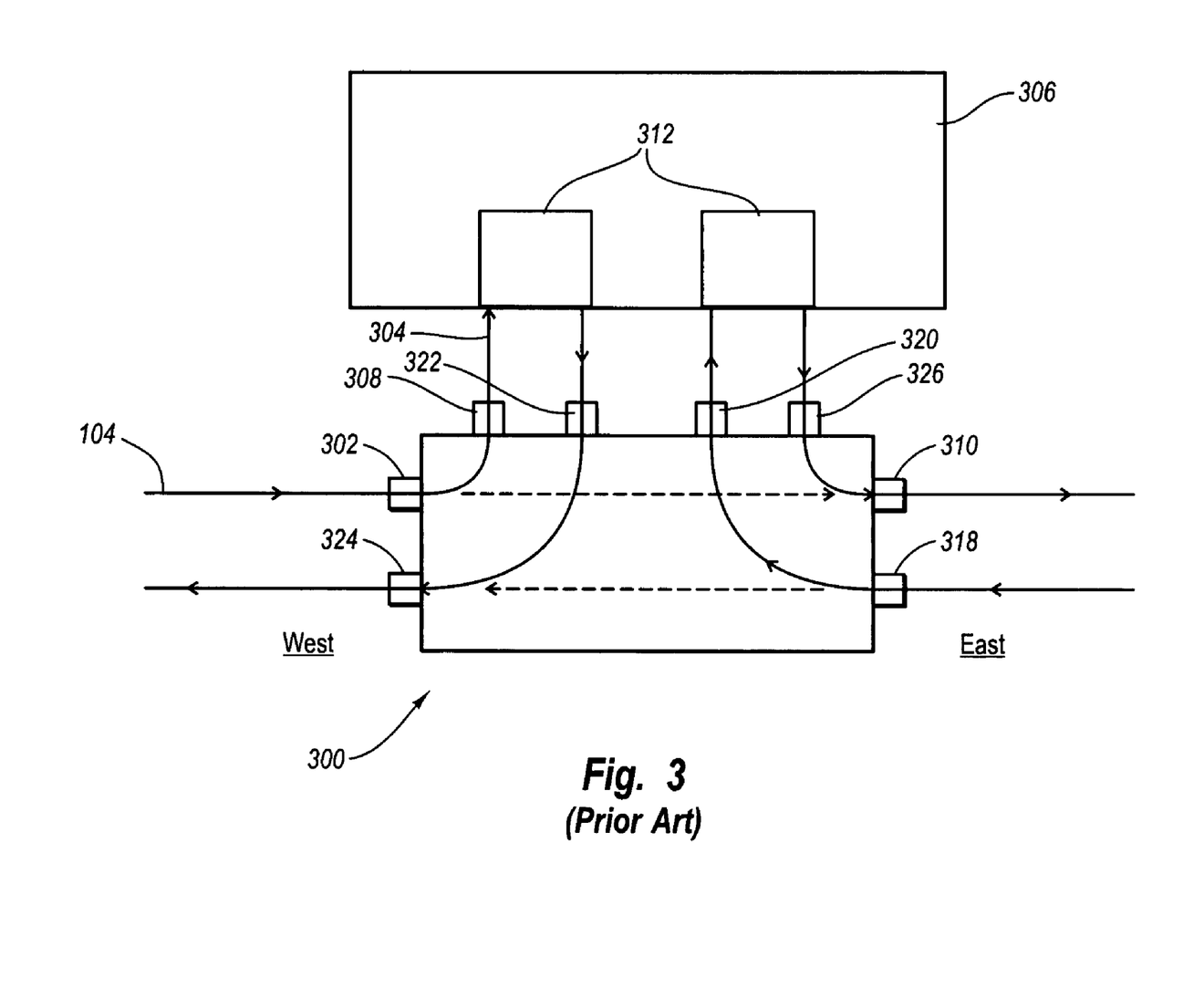
FIG. 3 illustrates an exemplary OADM for use in wavelength division multiplexing fiber optic networks.

An OADM is a component designed to extract an individual signal from the multiplexed transmission while allowing the remaining signals on the multiplexed transmission to pass through. The OADM also has an add port that can be used to remix the extracted signal with the multiplexed transmission or to transmit other data onto the fiber-optic network. An example of an OADM is shown in FIG. 3 and designated generally as 300. The OADM 300 is designed for bi-directional data communication. In optical networks, to distinguish the direction of data travel, the directions are referred to as east and west directions. In FIG. 3, data that travels in an easterly direction travels to the right of the OADM 300. Data the travels in a westerly direction travels to the left of the OADM 300.

Now illustrating the functionality of the OADM 300, a multiplexed transmission 104 is input into the east input port 302. The OADM 300 is designed for a specific wavelength or, more precisely, a band of wavelengths. For example, if the particular multiplexed transmission has four wavelengths, including a 1510 nanometer wavelength, a 1530 nanometer wavelength, a 1550 nanometer wavelength, and a 1570 nanometer wavelength, and the OADM 300 is designed to extract signals transmitted on the 1550 nanometer wavelength, the OADM may in fact extract any signal within a 12 nanometer bandwidth centered about the 1550 nanometer wavelength. As such, any wavelength between 1544 and 1556 nm is extracted by the OADM 300. In the present example, an individual signal 304 is extracted from the multiplexed transmission 104 and output to a device existing on the network, such as a network node 306, through the east drop port 308.

All other wavelengths remaining on the multiplexed transmission 104 continue through the OADM 300 and exit through an east output port 310, where they may continue to propagate on the fiber-optic network. If the OADM is a bi-directional module, such as OADM 300, a multiplexed transmission traveling in a westerly direction enters the OADM 300 at the west input port 318, drops the particular signal through the west drop port 320, adds a signal through the west add port 322, and propagates the remaining wavelengths through the west output port 324.

The network node 306 has two transceiver modules 312. In one embodiment, the transceiver modules may be GigaBit Interface Converters (GBICs). The transceiver modules 312 have an input port for accepting optical signals so that the signals can be converted to a data signal useful by the network node 306, and output ports for generating optical signals from the network node 306 so that data from the network node 306 may be propagated on the fiber-optic network. Optical signals from the network node 306 may be propagated onto the fiber-optic network such that they travel in an easterly direction by inputting the signals into the east add port 326 or propagated to the fiber-optic network, such that they travel in an westerly direction by inputting the signal signals into the west add port 322. By using an OADM that is bi-directional, redundancy may be added to the optical fiber network to provide for such contingencies as broken fibers in one of the directions. Optical add drop modules, such as OADM 300, are generally passive devices and are constructed using thin-film three-port devices, fused fiber devices, or other passive components.

One especially useful implementation of wavelength division multiplexing manifests itself in metro area network design. Applications of metro area networks may include remote storage services, intra-enterprise communication and high-speed data services. When designing metro area networks, designers face a particular set of challenges. For example, designers typically try to design metro area networks to have enough capacity that potential customers will find it worthwhile to purchase services from the metro area network provider. On the other hand, in the highly competitive arena of network services, network designers do not want to design an expensive network with high available bandwidth without being able to attract a sufficient number of customers to make the high bandwidth network profitable. Accordingly, there exists a need for a solution for designers by which more cost-efficient low bandwidth components can be used while preserving the option of efficiently upgrading the metro area network to higher bandwidth components.

BRIEF SUMMARY OF THE INVENTION

The present invention relates to systems for superimposing multiple dense wavelength division multiplexing (DWDM) signals on a single channel of a coarse wavelength division multiplexing (CWDM) system. The DWDM signals are preferably superimposed on the CWDM spectrum in a metro area network that has optical components that are otherwise designed for use with CWDM signals. This system increases the data transmission rates that can be achieved over an existing network that has less expensive CWDM optical components.

Accordingly, a first example embodiment of the invention is a method for sending DWDM signals on a CWDM infrastructure. The method generally includes: multiplexing a plurality of DWDM channels onto an optical signal, wherein each of the DWDM channels is of a wavelength that can be superimposed on a bandwidth of a CWDM channel; and propagating the optical signal onto a fiber optic network, wherein the fiber optic network comprises components that are compatible for use with CWDM signals.

Another example embodiment of the invention is an optical system for use in sending DWDM signals on a CWDM infrastructure. The system generally includes: a first DWDM multiplexer for receiving a first plurality of DWDM signals and multiplexing the first plurality of DWDM signals into a first multiplexed signal, wherein each of the DWDM channels is of a wavelength that can be superimposed on a bandwidth of a CWDM channel; and a CWDM multiplexer for receiving a plurality of signals over separate bandwidths of CWDM channels and multiplexing the plurality of signals into a second multiplexed signal for insertion into a fiber optic network, wherein one of the plurality of signals is the first multiplexed signal.

Yet another example embodiment of the invention is also an optical system for use in sending DWDM signals on a CWDM infrastructure. This system includes: a first DWDM multiplexer configured to receive a first plurality of DWDM signals and multiplex the first plurality of DWDM signals into a first multiplexed signal, wherein each of the DWDM channels is of a wavelength that can be superimposed on a bandwidth of a CWDM channel; and an optical add delete multiplexer configured to receive the first multiplexed signal from the first DWDM multiplexer and superimpose the first multiplexed signal onto a second multiplexed signal that comprises a plurality of CWDM signals.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The present invention relates to systems for superimposing multiple dense wavelength division multiplexing (DWDM) signals on a single channel of a coarse wavelength division multiplexing (CWDM) system. The DWDM signals can be superimposed on a CWDM spectrum in a metro area network that has optical components that are otherwise designed for use with CWDM signals. This system increases the data transmission rates that can be achieved over an existing network that has less expensive CWDM optical components. Of course, more than one of the CWDM channels can be occupied by DWDM signals if desired, thus increasing the multiplying effect by adding additional optical signals.

Reference will now be made to the drawings to describe various aspects of exemplary embodiments of the invention. It is to be understood that the drawings are diagrammatic and schematic representations of such exemplary embodiments, and are not limiting of the present invention, nor are they necessarily drawn to scale.

In the following description, numerous specific details are set forth in order to provide a thorough understanding of the present invention. It will be obvious, however, to one skilled in the art that the present invention may be practiced without these specific details. In other instances, well-known aspects of network systems have not been described in particular detail in order to avoid unnecessarily obscuring the present invention.

Figures 4, 4A:
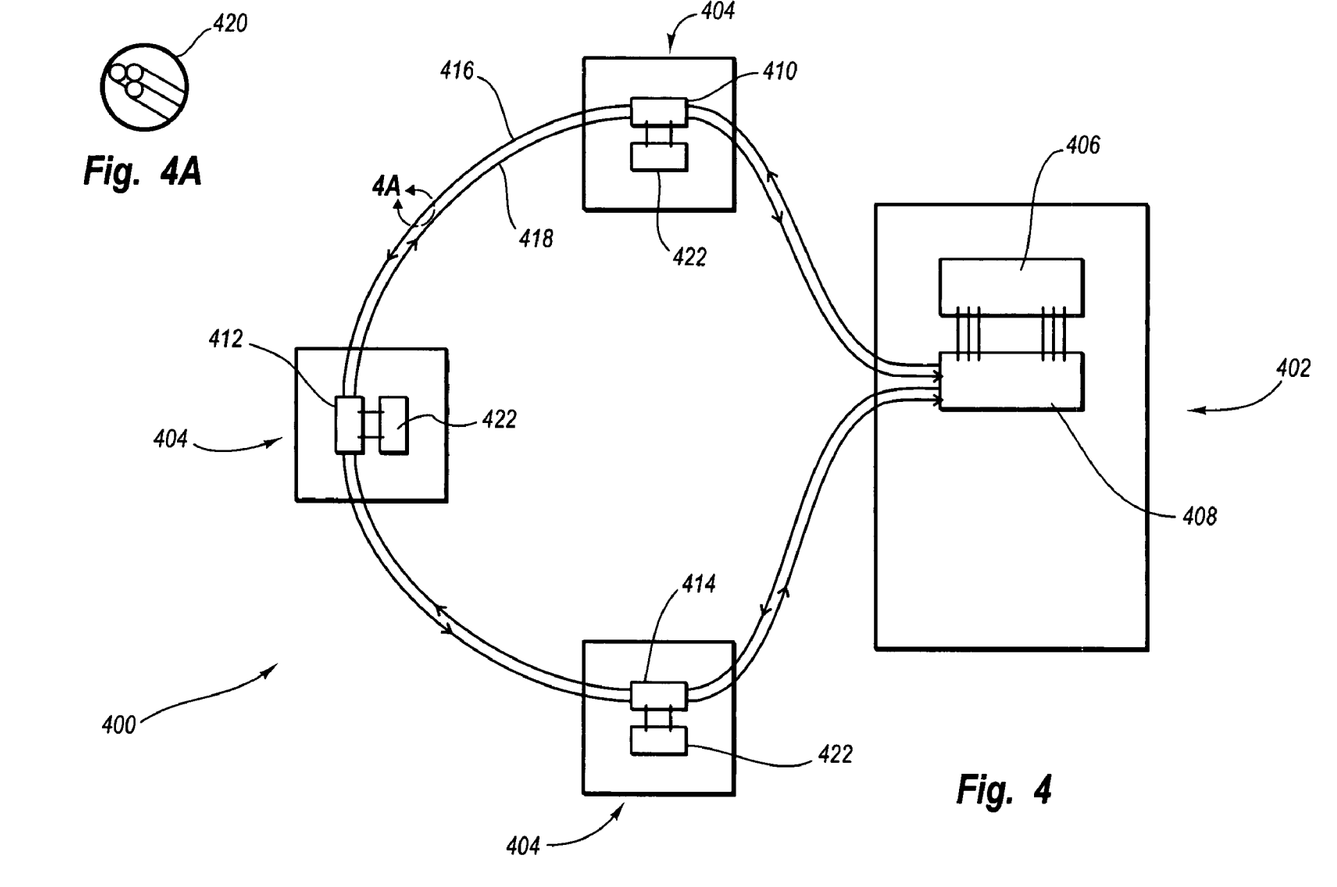
FIG. 4 illustrates an exemplary metro area network.

A typical metro area network is shown in FIG. 4 and designated generally as 400. The metro area network 400 has a carrier hotel site 402 that is connected by a fiber optic ring to three office buildings 404. The office buildings 404 are also commonly referred to as nodes on the metro area network 400. The carrier hotel site 402 provides datacentric services to the office buildings 404. Generally, a carrier hotel is a type of data center where multiple telecommunications network or service providers site their connections to one another's networks or client networks. Alternatively, a carrier hotel could be managed by a single service provider but provide distinct connections to each of the office buildings. Of course, the designation of the nodes as a "carrier hotel site" and "office buildings" will be understood by those skilled in the art as functional and not limited by building structures.

In the example of FIG. 4, the carrier hotel site 402 has a network switch 406 that is connected to the data services required by each of the office buildings 404. The network switch 406 is operably connected to a four-channel mux/demux 408. In this example, although the mux/demux 408 has capacity for four channels, only three channels are used, one for each office building 404. Each of the office buildings 404 has an optical add drop multiplexer (OADM) 410, 412, and 414. The OADM 410, 412, or 414 in each of the office buildings is designed for a specific channel or optical wavelength. For example, the OADM 410 may be designed to extract signals having a wavelength of 1530 nanometers. The OADM 412 may be designed to extract signals having a wavelength of 1550 nanometers. The OADM 414 may be designed to extract signals having a wavelength of 1570 nanometers.

Each of the office buildings 404 on the metro area network 400 also has an office building switch 422 for routing data services within the particular office building 404. The office building switch 422 can be, for example, an Ethernet switch, an optical networking platform, or a fiber channel storage switch. The metro area network 400 uses two optical fibers 416 and 418 to send bi-directional optical data on the network. In this example, as shown by the blowup 420 in FIG. 4A, three signals of different optical wavelengths are sent through the fibers 416 and 418.

Figure 5:
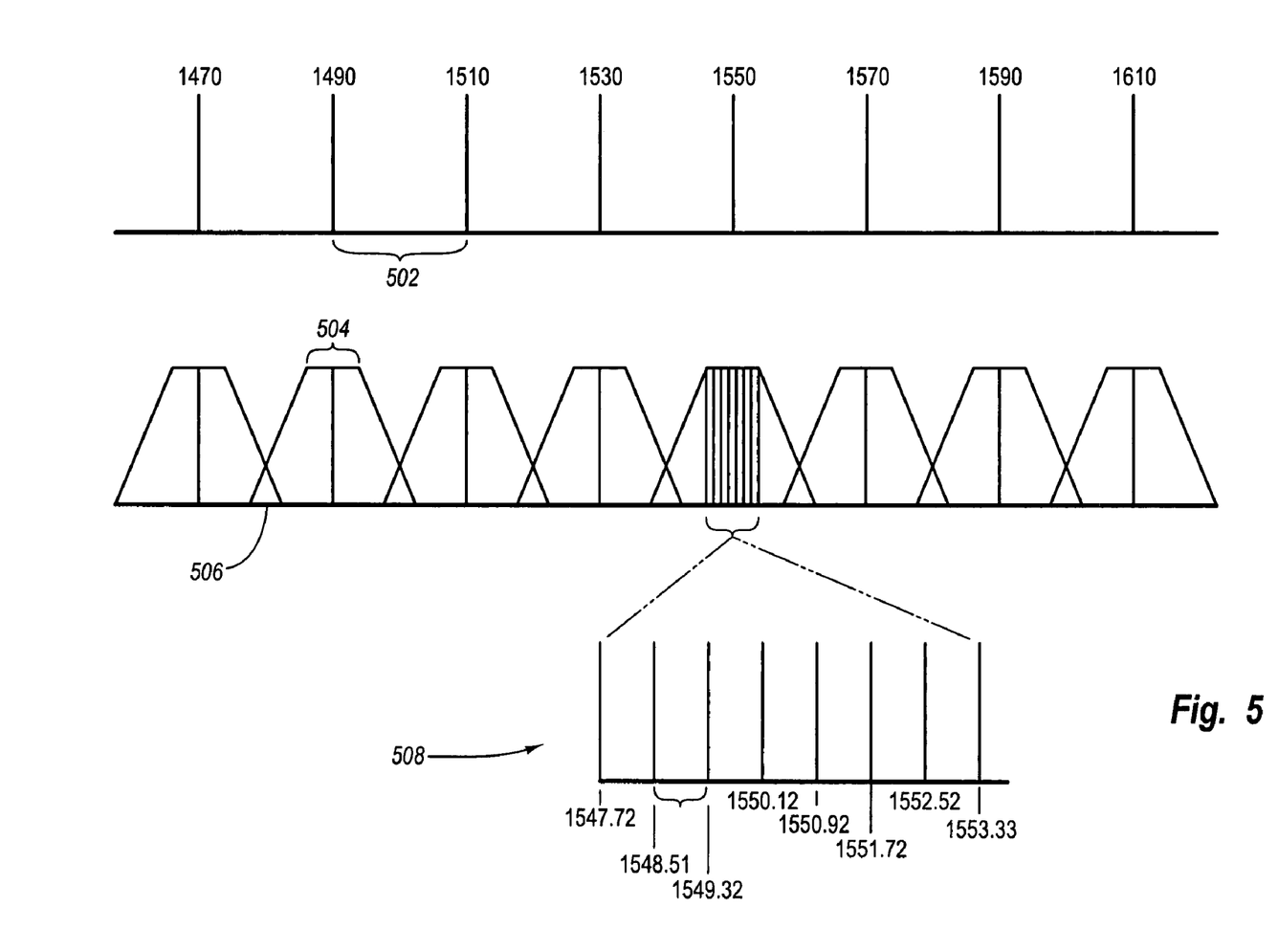
FIG. 5 illustrates channel spacing in CWDM systems and an exemplary embodiment of channel spacing used by the invention.

In the present example, only three wavelengths are required to provide data services to the office buildings 404. Therefore, a type of wavelength division multiplexing known as CWDM may provide adequate service for this particular metro area network 400, depending on the bandwidth needed by each of the office buildings 404. In fact, many metro area networks require fewer than sixteen wavelengths with a total ring distance of less than 40 km. Furthermore, in systems having data rates between about 1.2 Gbit/s and 2.5 Gbit/s per channel, a CWDM system is adequate to implement many metro area networks. CWDM defines channels using wavelengths from 1470 nanometers to 1610 nanometers, with spacing between channels of 20 nanometers. Additionally, each channel has a 12 nanometer bandwidth, meaning that the wavelength of a particular channel may vary up to six nanometers to either side of the nominal wavelength. This CWDM system is illustrated in FIG. 5, which shows the eight channels available for use in CWDM, beginning at 1470 nanometers and ending at 1610 nanometers. The channel spacing 502 between each of the adjacent channels is 20 nanometers. The bandwidth 504 of each of the channels is 12 manometers. Such an arrangement helps to prevent cross-talk between adjacent channels, such as that which occurs when the signals drift into an overlapping area 506.

Coarse wavelength division multiplexing systems, as the name implies, have relatively wide channel spacings. As such, more cost-efficient components that exhibit more wavelength drift may be used in the implementation of the network. Factors that can cause wavelength drift in the fiber optic network include temperature variations of the lasers transmitting the optical signals, temperature variations of the individual components that make up the network, and physical bending stresses on fibers within the optical network.

A second type of wavelength division multiplexing that may be used in a metro area network is DWDM. As its name suggests, DWDM networks have much narrower channel spacings than CWDM networks. As such, more channels and hence more bandwidth can be provided on the network. The tradeoff for this higher network capacity is that more expensive components exhibiting less temperature stress and physical stress sensitivities must be used. Dense wavelength division multiplexing technology was originally intended for long-haul networks requiring hundreds of wavelengths built with expensive high-performance optics. Although DWDM systems provide superior scalability compared to CWDM systems, they do so at an increased cost per wavelength.

The present invention takes advantage of the cost-effective implementation of a CWDM system, while exhibiting the scalability available in DWDM systems. A general understanding of the principles involved in implementing DWDM on a CWDM system can be obtained by examining FIG. 5, which shows DWDM channels mapped onto the bandwidth of CWDM channels. As noted above, in the CWDM arrangement, the individual channels have a channel spacing 502 of 20 manometers. Each channel bandwidth 504 is 12 nanometers. By using DWDM channels 508 superimposed over the bandwidth 504 of a CWDM channel, CWDM components can be used in combination with DWDM components to effectively increase the bandwidth of the metro area network by factor of eight in one particular embodiment. For example, while eight channels is the maximum number available in a CWDM network, by superimposing eight DWDM channels over the CWDM channels, 64 channels can be achieved.

Figure 6:
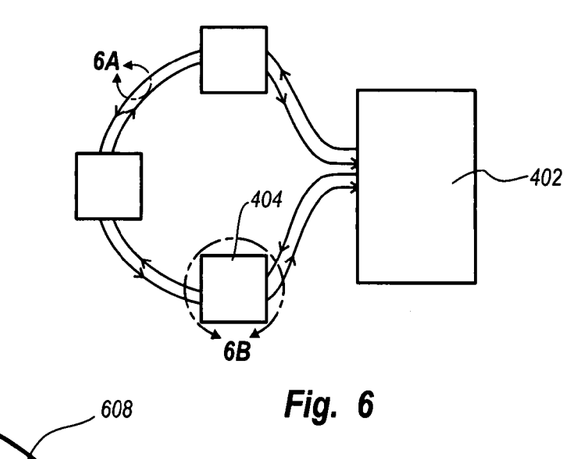
FIG. 6 illustrates a metro area network implemented on existing CWDM infrastructure utilizing DWDM components according to embodiments of the invention.
Figure 6A:
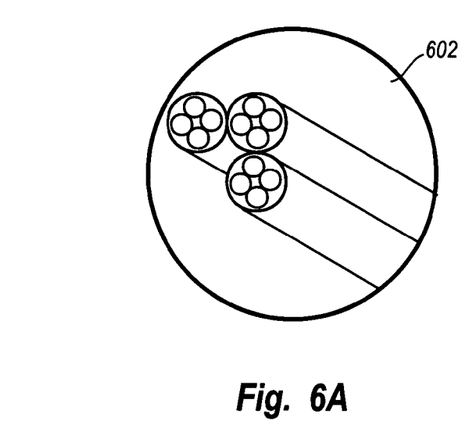

An exemplary hardware configuration for implementing DWDM on a CWDM system is shown in FIG. 6, which illustrates an example of increasing the network bandwidth to each of the office buildings 404 by a factor of four. To accomplish this increase in bandwidth, DWDM components are added to the metro area network at various points. At the carrier hotel site 402, DWDM multiplexers and transceivers are added to generate and decode the DWDM signals. The addition of these components allows the carrier hotel site 402 to transmit and receive DWDM signals superimposed over the bandwidth of CWDM channels, as shown by the blowup 602 in FIG. 6A.

Figure 6B:
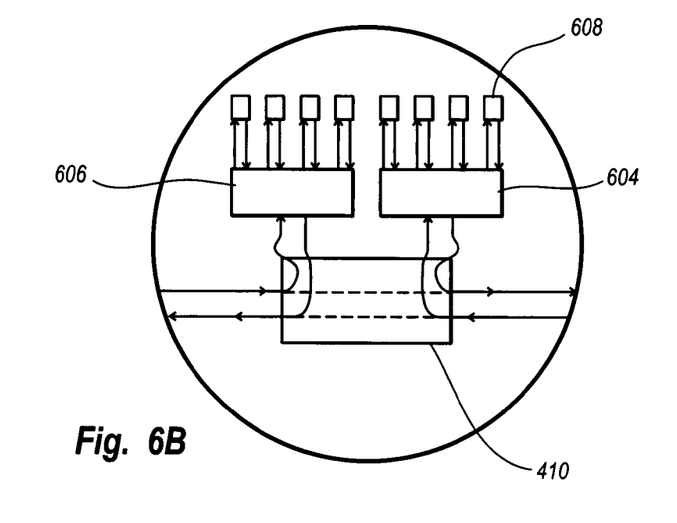

At each of the office buildings 404, additional DWDM hardware is added as illustrated in FIG. 6B. Each of the office buildings 404 has a CWDM OADM 410 designed to extract a particular CWDM channel. As discussed above, the OADM 410 extracts any wavelength of light within the bandwidth 504 of a CWDM channel. Therefore, DWDM channels superimposed over the bandwidth of a CWDM channel as shown in FIG. 5 are extracted by the OADM 410. In this example, two four-channel DWDM mux/demuxes 604, 606 are used to further divide the superimposed DWDM channels into their constituent parts so that the individual DWDM channels may be routed to DWDM GBIC transceivers 608. The GBIC transceivers 608 return data to the network through the DWDM mux/demuxes that multiplex the signals and return them to the metro area network.

By using pluggable DWDM transceivers, network designers can build low-cost CWDM networks and then scale the bandwidth with DWDM technology as the network grows. Using a 100 GHz DWDM pluggable transceiver, the network can be scaled to 64 wavelengths when using an eight wavelength CWDM system. Using a 50 GHz transceiver, 128 wavelengths can be implemented on the CWDM network. Using a 25 GHz transceiver, the network can be scaled to 256 wavelengths.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method for scaling a bandwidth of a coarse wavelength division multiplexing infrastructure, the method comprising:

selecting a plurality of pluggable transceivers to scale a channel density of a coarse wavelength division multiplexing infrastructure according to use of a network, wherein a bandwidth of each channel associated with each pluggable transceiver is selected based in part on the use of the network;

multiplexing channels associated with the plurality of pluggable transceivers onto an optical signal, wherein each of the channels is of a wavelength that can be superimposed on a bandwidth of a coarse wavelength division multiplexing channel; and propagating the optical signal onto a fiber optic network, wherein the fiber optic network comprises components that are compatible for use with coarse wavelength division multiplexing signals.

2. The method as defined claim 1, wherein multiplexing the channels comprises superimposing the one or more of the channels on the coarse wavelength division multiplexing bandwidth of said components of the fiber optic network.

3. The method as defined claim 1, wherein the optical signal is propagated onto the fiber optic network at a first node, the method further comprising the act of removing the optical signal from the fiber optic network at a second node.

4. The method as defined claim 3, wherein the first node and the second node comprise separate nodes within a metro area network and wherein the first node comprises a carrier hotel site that provides data services to the second node.

5. The method as defined claim 1, further comprising replacing the plurality of pluggable transceivers such that the channel density of a coarse wavelength division multiplexing infrastructure is scaled to a second channel density.

6. The method as defined claim 3, wherein the first node comprises a four-channel mux/demux for sending and receiving data on up to four CWDM channels and the second node comprises an optical add delete multiplexer for sending and receiving data on a specific CWDM channel.

7. The method as defined claim 6, wherein the first node further comprises a switch for routing data services communicated over the specific CWDM channel.

8. The method as defined claim 1, wherein the coarse wavelength division multiplexing channel is selected from the 1510, 1530, 1550, and 1570 nm CWDM channels.

9. An optical system for use in scaling a bandwidth of a coarse wavelength division multiplexing (CWDM) infrastructure, the system comprising:

a plurality of pluggable transceivers selected to scale a bandwidth of a coarse wavelength division multiplexing infrastructure from a first channel density to a second channel density according to use of the infrastructure, each transceiver generating a signal associated with a channel that has a bandwidth selected in part on the use of the infrastructure;

a first multiplexer for receiving a first plurality of signals from the plurality of pluggable transceivers and multiplexing the first plurality of signals into a first multiplexed signal, wherein each of the signals is of a wavelength that can be superimposed on a bandwidth of a CWDM channel such that the bandwidth of the CWDM infrastructure is scaled to the second channel density; and a CWDM multiplexer for receiving a plurality of signals over separate bandwidths of CWDM channels and multiplexing the plurality of signals into a second multiplexed signal for insertion into a fiber optic network, wherein one of the plurality of signals is the first multiplexed signal.

10. The system as defined claim 9, further comprising additional pluggable transceivers that scale the bandwidth of the CWDM infrastructure to a third channel density, wherein the third channel density include DWDM channels.

11. The system as defined claim 10, wherein the second multiplexed signal is received at a second node in the metro area network, the second node comprising:

an optical add delete multiplexer configured to remove the first multiplexed signal from the second multiplexed signal and add a fourth multiplexed signal to the second multiplexed signal; and a DWDM multiplexer/demultiplexer configured to receive the first multiplexed signal, demultiplex the first multiplexed signal into the first plurality signals, multiplex a second plurality of signals into the fourth multiplexed signal, and communicate the fourth multiplexed signal to the optical add delete multiplexer, wherein the first plurality of signals comprises DWDM signals.

12. A system as defined in claim 11, further comprising a second DWDM multiplexer configured to receive a second plurality of DWDM signals and multiplex the second plurality of DWDM signals into a third multiplexed signal, wherein each of the second plurality of DWDM signals is of a wavelength that can be superimposed on the same bandwidth of a CWDM channel as the first multiplexed signal, wherein the optical add delete multiplexer is configured to receive the third multiplexed signal and superimpose the third multiplexed signal with the second multiplexed signal over the same bandwidth channel as the first multiplexed signal.

13. A system as defined in claim 9, wherein the plurality of pluggable transceivers further comprise DWDM transceiver modules in communication with the first multiplexer.

14. A system as defined in claim 13, wherein the DWDM transceiver modules comprise GigaBit Interface Converters selected from one of 100 GHz modules such that the second channel density is 64 channels, 50 GHz modules such that the second channel density is 128 channels, or 25 GHz modules such that the second channel density is 256 channels.

15. The system as defined claim 13, further comprising a switch in communication with the DWDM transceiver modules for routing data to and from other optical and/or computing devices.

16. The system as defined claim 9, wherein the first multiplexer comprises a DWDM multiplexer/demultiplexer module.

17. An optical system for use in scaling a channel density of a coarse wavelength division multiplexing (CWDM) infrastructure, the system comprising:
  a first multiplexer configured to receive a first plurality of signals originating from a plurality of pluggable transceivers and multiplex the first plurality of signals into a first multiplexed signal, wherein each of the signals is of a wavelength that can be superimposed on a bandwidth of a CWDM channel; and
  an optical add delete multiplexer (OADM) configured to receive the first multiplexed signal from the first multiplexer and superimpose the first multiplexed signal onto a second multiplexed signal that comprises a plurality of CWDM signals such that a channel density of the CWDM infrastructure increases from a first channel density to a second channel density according to use of the infrastructure, wherein a bandwidth of each pluggable transceiver is selected in part on the use of the infrastructure.

18. The system as defined claim 17, wherein the first multiplexer and the OADM are part of a first node within a metro area network and the first multiplexer comprises a DWDM multiplexer and the first plurality of signals comprise DWDM signals.

19. The system as defined claim 18, wherein the second multiplexed signal is received at a second node in the metro area network, the second node comprising:

a CWDM demultiplexer for receiving the second multiplexed signal, removing the first multiplexed signal from the second multiplexed signal, and adding a fourth multiplexed signal to the second multiplexed signal; and a DWDM multiplexer/demultiplexer for receiving the first multiplexed signal from the CWDM demultiplexer, demultiplexing the first multiplexed signal into the first plurality of DWDM signals, multiplexing a second plurality of DWDM signals into a fourth multiplexed signal, and communicating the fourth multiplexed signal to the CWDM demultiplexer.

20. A system as defined in claim 17, further comprising a second DWDM multiplexer configured to receive a third plurality of DWDM signals and multiplex the third plurality of DWDM signals into a third multiplexed signal, wherein each of the third plurality of DWDM signals is of a wavelength that can be superimposed on the same bandwidth of a CWDM channel as the first multiplexed signal, wherein the optical add delete multiplexer is configured to receive the third multiplexed signal and superimpose the third multiplexed signal to the second multiplexed signal over the same bandwidth channel as the first multiplexed signal.

21. A system as defined in claim 17, wherein the plurality of pluggable transceivers comprise DWDM transceiver modules in communication with the first DWDM multiplexer.

22. A system as defined in claim 21, wherein the DWDM transceiver modules comprise GigaBit Interface Converters selected from one of 100 GHz modules such that the second channel density is 64 channels, 50 GHz modules such that the second channel density is 128 channels, or 25 GHz modules such that the second channel density is 256 channels.

23. The system as defined claim 21, further comprising a switch in communication with the DWDM transceiver modules for routing data to and from other optical and/or computing devices.

24. The system as defined claim 17, wherein the first multiplexer comprises a multiplexer/demultiplexer module.

* * * * *

UNITED STATES PATENT AND TRADEMARK OFFICE
CERTIFICATE OF CORRECTION

PATENT NO. : 7,389,017 B2  Page 1 of 1
APPLICATION NO. : 10/802434
DATED : January 17, 2008
INVENTOR(S) : Aldridge It is certified that error appears in the above-identified patent and that said Letters Patent is hereby corrected as shown below:

Column 2
Line 38, change "the" to --that--

Column 3
Line 14, delete "signal"

Column 6
Line 11, change "manometers" to --nanometers--
Line 46, change "manometers" to --nanometers--

Column 7
Lines 54, 58, 62, and 66, change "defined" to --defined in--

Column 8
Lines 3, 8, 11, 39 and 43, change "defined" to --defined in--
Line 42, change "include" to --includes--
Line 53, change "plurality" to --plurality of--

Column 9
Lines 14, 18, 40, and 45, change "defined" to --defined in--

Column 10
Lines 39 and 44, change "defined" to --defined in--

Signed and Sealed this

Twenty-third Day of November, 2010

David J. Kappos
*Director of the United States Patent and Trademark Office*